United States Patent
Knudsen

(10) Patent No.: US 11,929,855 B2
(45) Date of Patent: Mar. 12, 2024

(54) DIGITAL RECEIVER WITH PHASE OFFSET COMPENSATION

(71) Applicant: WIDEX A/S, Lynge (DK)

(72) Inventor: Niels Ole Knudsen, Humlebaek (DK)

(73) Assignee: Widex A/S, Lynge (DK)

(*) Notice: Subject to any disclaimer, the term of this patent is extended or adjusted under 35 U.S.C. 154(b) by 21 days.

(21) Appl. No.: 17/775,052

(22) PCT Filed: Oct. 21, 2020

(86) PCT No.: PCT/EP2020/079548
§ 371 (c)(1),
(2) Date: May 6, 2022

(87) PCT Pub. No.: WO2021/089322
PCT Pub. Date: May 14, 2021

(65) Prior Publication Data
US 2022/0393919 A1 Dec. 8, 2022

Related U.S. Application Data

(60) Provisional application No. 62/932,721, filed on Nov. 8, 2019.

(51) Int. Cl.
*H04L 27/18* (2006.01)
*H04L 27/227* (2006.01)
*H04L 27/00* (2006.01)

(52) U.S. Cl.
CPC .. *H04L 27/2273* (2013.01); *H04L 2027/0026* (2013.01); *H04L 2027/0067* (2013.01)

(58) Field of Classification Search
CPC ......... H04L 27/2273; H04L 2027/0026; H04L 2027/0036; H04L 27/18
(Continued)

(56) References Cited

U.S. PATENT DOCUMENTS 3,993,868 A * 11/1976 Balcewicz .......... H04L 27/2014
375/336
4,583,048 A * 4/1986 Gumacos ............ H04L 27/2273
375/336
(Continued)

*Primary Examiner* — Qutbuddin Ghulamali
(74) *Attorney, Agent, or Firm* — Sughrue Mion, PLLC

(57) ABSTRACT

A digital receiver being adapted for receiving an MSK modulated signal, comprises a digital front-end unit (10) adapted for providing samples having a phase value ($\theta_{measure}$) of a down-mixed signal, a phase compensation unit (11) adapted for compensating the phase value ($\theta_{measure}$) by delivering a phase offset compensated sample having a phase value ($\theta_{sync}$), and a coherent demodulator (12) adapted for recovering information content from the phase offset compensated sample. The phase compensation unit (11) is adapted for analyzing a phase value ($\theta_{sync}$) of the phase offset compensated sample, calculating a phase offset value ($\theta_{offset}$) based on the phase value ($\theta_{sync}$) of the phase offset compensated sample, and applying the phase offset value ($\theta_{offset}$) when delivering a subsequent phase offset compensated sample.

15 Claims, 2 Drawing Sheets

(58) Field of Classification Search
USPC .......................................................... 375/325
See application file for complete search history.

(56) References Cited

U.S. PATENT DOCUMENTS

| | | | | |
|---|---|---|---|---|
| 4,995,052 | A * | 2/1991 | Thorvaldsen | .......... H04B 1/707 |
| | | | | 375/150 |
| 5,164,965 | A * | 11/1992 | Karaali | ................ H04L 7/0331 |
| | | | | 375/355 |
| 5,274,672 | A * | 12/1993 | Weiss | ........................ H04L 7/04 |
| | | | | 375/336 |
| 2006/0291550 | A1 * | 12/2006 | Wang | ................ H04L 27/0014 |
| | | | | 375/232 |
| 2015/0222419 | A1 * | 8/2015 | Bachmann | ................ H03L 7/08 |
| | | | | 375/327 |
| 2022/0393919 | A1 * | 12/2022 | Knudsen | ............. H04L 27/2273 |

* cited by examiner

DIGITAL RECEIVER WITH PHASE OFFSET COMPENSATION

CROSS REFERENCE TO RELATED APPLICATIONS

This application is a National Stage of International Application No. PCT/EP2020/079548 filed Oct. 21, 2020, claiming priority based on U.S. Patent Application No. 62/932,721 filed Nov. 8, 2019.

The present invention relates to a digital receiver adapted for receiving MSK modulated signal. The invention, more particularly, relates to a digital receiver for use in a magnetic induction radio used in a hearing assistive device, and comprising a phase compensation unit adapted for compensating for a phase offset for the samples of a down-mixed signal. Also, the invention relates to a method for compensating for a phase offset for the samples of a down-mixed signal.

In a wireless system, the receiver has no access to the transmitters carrier signal. Hence, the transmitter and receiver will modulate and demodulate with separate frequencies that intentionally are close, but not identical. The frequency difference translates to a phase offset between the transmitted IF and received IF signal. This phase offset varies in time. Optimal coherent detection requires the receiver to detect and compensate for this phase offset.

The purpose of the invention is to provide a receiver detecting and compensating for a phase offset due to difference in the carrier frequency of the received signal and the demodulator.

This purpose is achieved by a method enabling a digital receiver to detect the phase offset for an MSK modulated signal. The method is economic and robust and does not require correctly detected data for proper detection. The invention is defined in claims 1 and 8. Preferred embodiments are defined in the dependents claims.

According to a first aspect of the invention there is provided a digital receiver adapted for receiving an MSK modulated signal and comprising a digital front-end unit adapted for providing samples having a phase value of a down-mixed signal, a phase compensation unit adapted for compensating the phase value by delivering a phase offset compensated sample having a phase value, and a coherent demodulator adapted for recovering information content from the phase offset compensated sample. The phase compensation unit is adapted for analyzing a phase value of the phase offset compensated sample, calculating a phase offset value based on the phase value of the phase offset compensated sample, and applying the phase offset value when delivering a subsequent phase offset compensated sample.

The invention will be described in further detail with reference to preferred aspects and the accompanying drawing, in which.

DETAILED DESCRIPTION

Figure 1:
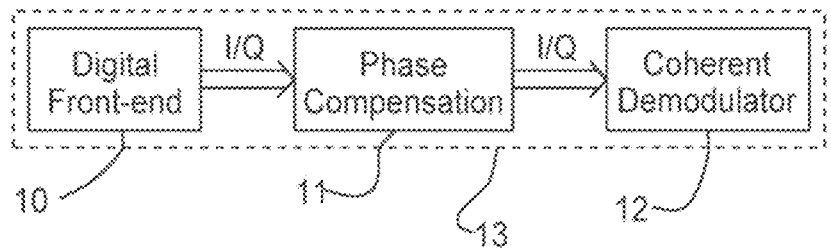
FIG. 1 shows a digital receiver 13 according to one embodiment of the invention and adapted for receiving MSK modulated signal.

FIG. 1 shows a digital receiver 13 according to one embodiment of the invention and adapted for receiving MSK modulated signal. The digital receiver 13 comprises a digital front-end unit 10 adapted for outputting samples of a down-mixed signal. The samples are delivered at a constant sampling rate in the form of a real and imaginary sample. The samples are received in a phase compensation unit 11 adapted for compensating for a phase offset for the samples of a down-mixed signal. The phase offset is mainly caused by a mismatch between carrier frequencies used at the transmitter side and the receiver side. The digital receiver 13 further comprises a coherent demodulator 12 adapted for recovering information content from the incoming MSK modulated signal.

Figure 6:
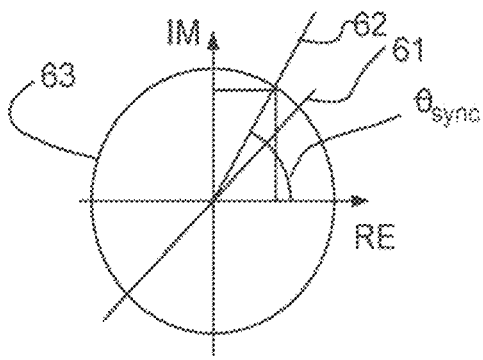
FIG. 6 illustrates how $\theta$ modulus $\pi/2 > \pi/4$ can be calculated by simple logic decisions.

In the digital receiver 13, complex IF samples are handled at a constant sampling rate in the form of a real and an imaginary sample. The complex IF samples makes it easy to perform the calculation of ($\theta$ modulus $\pi/2 > \pi/4$) extremely economical. The complex IF input sample is denoted as RE+j IM the calculation whether $\theta$ modulus $\pi/2 > \pi/4$ can be done by simple logic decisions based on whether (|IM|>|RE|), (RE>0), and (IM>0). This is illustrated in FIG. 6, where the line 61 represents IM=RE, and the line 62 represents a complex sample. The line 62 represents a phase $\theta_{sync}$ and it is seen that the IM-value is greater than the RE-value at the intersection point with a circle 63. Both the IM-value and the RE-value are positive at the intersection point with a circle 63, why $\theta_{sync}$ modulus $\pi/2 > \pi/4$. These evaluations are used in step 24 in the method explained with reference to FIG. 2.

Minimum Shift Keying (MSK) is a signaling format where digital information is modulated by changing the phase of a radio signal relative to a fixed carrier frequency. The phase changes at a constant rate (equivalent to a constant frequency deviation relative to carrier) for the duration of the time it takes to transmit one symbol. The phase change is ±90 degrees depending of the digital information to be transmitted. The digital information can for example be coded as +90 degrees for a logic "1" and −90 degrees for a logic "0". This is explained in more details below.

A continuous phase FSK (CPFSK) signal have the form:

$$\Phi = A \cos(\omega_c t + \gamma(t)),$$

with the phase $\gamma(t)$ being a continuous function of time. The signal is based on two frequencies $\omega_1$ and $\omega_2$, where $\omega_c = (\omega_1 + \omega_2)/2$ and $\Delta\omega = (\omega_1 - \omega_2)/2$.

In the interval $0 < t \leq T$ the phase is a linear function of time:

$$\gamma(t) = \pm \Delta\omega t + \gamma(0), \text{which gives:}$$

$$\Phi = A \cos(\omega_c t \pm \Delta\omega t + \gamma(0)),$$

For minimum-shift keying (MSK), we have $\Delta\omega = \pi/2T$. This is the minimum frequency spacing between $\omega_1$ and $\omega_2$ that allows the two FSK signals to be orthogonal to each other. T is the symbol width. This criterion means that the frequency separation between $f_1$ and $f_2$ must be such that there is a half cycle difference in one-bit interval.

By using this condition, we get:

$$\gamma(t) = \pm t\pi/2T + \gamma(0), \text{ for } 0 < t \leq T.$$

By choosing γ(0)=0, the possible values of γ(t) for t>0 can be shown as a phase trellis diagram. The phase at multiples of T can therefore only assume a set of discrete values. More specifically, over each symbol duration, T, the phase of the MSK waveform can only be advanced or retarded by exactly 90 degrees—it ramps up by 90 degrees when a "1" is transmitted, and down by 90 degrees when a "0" is transmitted.

Figure 3:
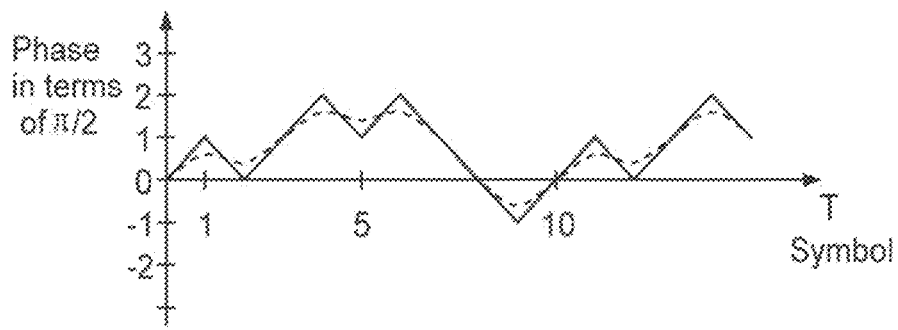
FIG. 3 shows an example for a phase trellis diagram.

FIG. 3 shows a phase trellis diagram for such coding when transmitting a sequence of 1-0-1-1-0-1-0-0-0-1-1-0-1-1-0 etc. Minimum Shift Keying (MSK) uses two frequencies which are separated by ½T and phase discontinuity is avoided in symbol boundaries. MSK is a continuous phase transmit signal with phase changes through multiples of π/2 radians.

FIG. 3 shows the phase trellis for ideal MSK signal on a transmitter side without having been exposed to any bandwidth limitation. However, when the signal has been modulated to a carrier (transmitter frequency), transmitted, received, filtered and down mixed with a carrier frequency close to the transmitter frequency, there will be two significant differences compared to an ideal transmitter IF signal:

The phase will be offset, and

The signal will be intentionally bandwidth limited to reduce noise. This affects the phase function.

In a real and non-ideal setup, the phase trellis shown in FIG. 3 will have rounded peaks and valleys (indicated by the sine-curved dotted line). Furthermore, the phase offset will displace entire curve in time or symbols. Disregarding from the displacement of the curve due to the undesired phase offset, the phase trellis curve is perfectly synchronized and can be demodulated directly and coherently. In a real implementation in a magnetic induction radio used in a pair of hearing aids, the bandwidth limiting function may be seen as a matched cosine filter, which yields optimal signal to noise performance to white noise disturbance.

Figure 4:
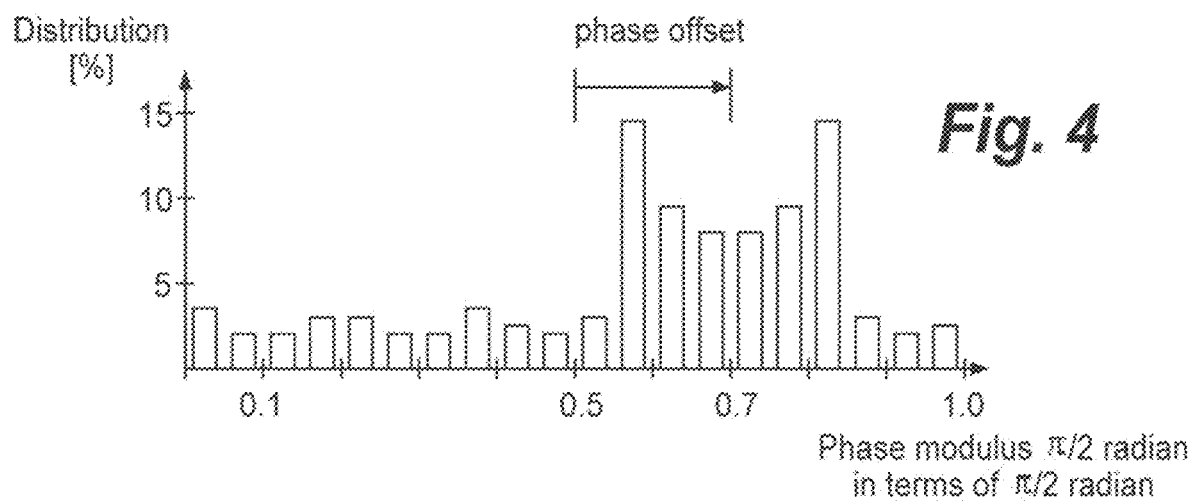
FIG. 4 shows a phase histogram for a signal with a phase offset.

When analyzing the phase distribution for samples of the bandwidth-limited signal, it is observed that the distribution of samples will have higher density for phases around π/4+nπ/2, where n is an integer. Furthermore, when inspecting the distribution of samples for the phase in the range 0–π/2, the phase distribution will have center of gravity at π/4 and will be almost symmetrical around the center of gravity. A histogram for a perfectly synchronized signal will be symmetric around π/4 radians. In presence of an undesired phase offset, the histogram will be shifted/rotated right or left depending on the sign and magnitude of offset. The "phase modulus π/2" value of the IF samples is illustrated in FIG. 4 showing a histogram for a signal with a phase offset (marked in FIG. 4) of +0.2×π/2 radians. The histogram illustrated in FIG. 4 contains information that can be used to adjust for the phase offset. In FIG. 4, the phase values are distributed in 20 bins.

Figure 5:
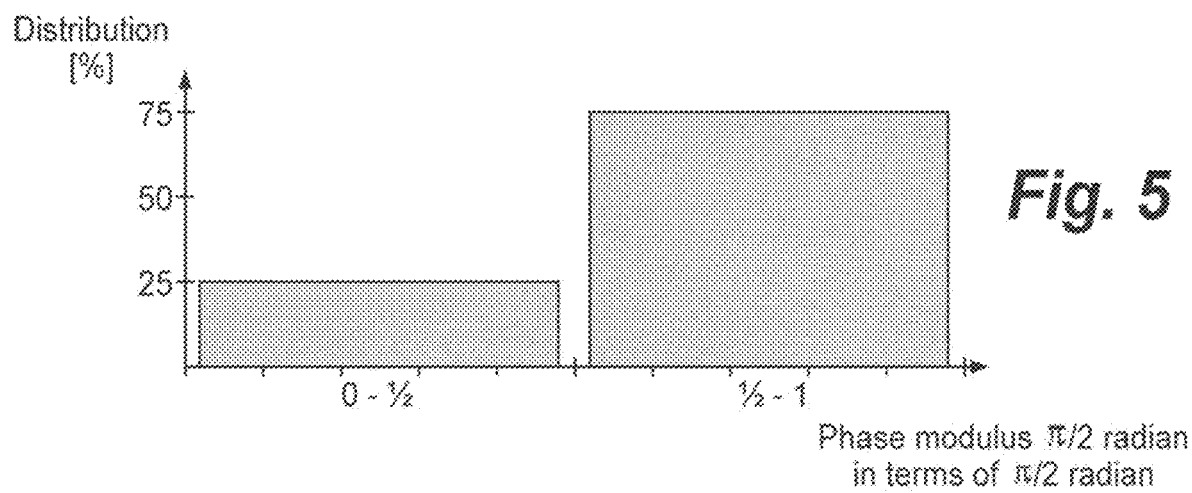
FIG. 5 shows a 2-bin phase histogram for the data used in FIG. 4.

In a digital receiver it is economical affordable to calculate the "phase modulus π/2" value of the IF samples, and to determine whether the result is below or above π/4. This calculus may result in a 2-bin histogram as shown in FIG. 5, where values in the range between 0 and π/4 ends in a first bin, and values in the range π/4 and π/2 ends in the second bin. When phase offset is larger than zero there will be a higher representation of the IF samples with "phase modulus π/2" value being above π/4 and vice versa. This also applies IF samples with noise present. You will no longer be able to visually identify the phase offset in FIG. 5, but the center of gravity is in the shown example present in the bin representing phases in the range from 0,5-1,0 π/2.

The phase offset is generated by an error caused by a mismatch between the carrier frequencies used at the transmitter side and the receiver side, even though the two carrier frequencies ideally should be identical. When the mismatch between the two carrier frequencies remains substantially stable over time, it has been realized that the direction of the phase offset is important. An ideal situation will be when the phase offset is zero. By adding a compensation value to the IF samples, it is possible to compensate for the phase offset caused by a mismatch between carrier frequencies used at the transmitter side and the receiver side.

Even though the presence of noise affects the phase offset for the IF samples, and the probability difference is less significant compared to a noise free IF sample signal, the probability difference can still be used to compensate for phase offset. Data for the distribution of the "phase modulus π/2" value, is according to the invention used in an iterative process where the incoming IF sample signal is adjusted for a phase offset in order to obtain a distribution of the "phase modulus π/2" value being symmetric around π/4.

Figure 2:
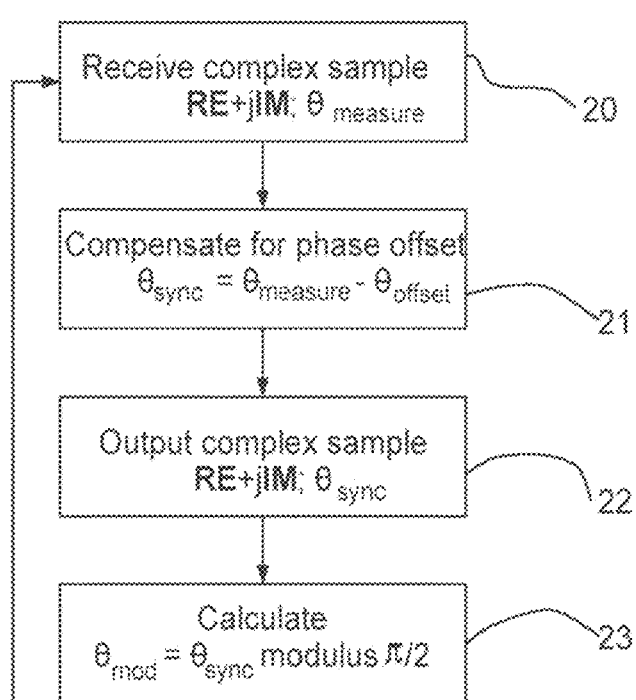
FIG. 2 illustrates a flow chart for a method for phase offset compensation according to the invention.

FIG. 2 illustrates a flow chart for a method for phase offset compensation. According to one aspect of the invention, the method is implemented on a digital receiver. The down-mixed signal is entered digitally into the phase compensation unit 11 at a constant sampling rate. The signal is represented in polar form as radius and phase. The incoming signal is denoted as R and $\theta_{measure}$ and is received in the phase compensation unit 11 at step 20. In step 21, the signal is phase compensated by subtracting a phase offset value denoted $\theta_{offset}$ from the incoming phase value, $\theta_{measure}$, of the sample. The offset-adjusted phase, $\theta_{sync}$, represents the phase for the synchronized signal that can be used directly for coherent demodulation.

After the phase compensation, the sample is output in step 22 to the coherent demodulator 12 for symbol detection. Depending on the phase, $\theta_{sync}$, of the synchronized signal, a small adjustment is performed to the phase offset, ° offset, by either adding or subtracting an adjustment value $\theta_{adjust}$. In step 23, a phase value, $\theta_{mod}$, is calculated as the "modulus π/2" value of the phase, $\theta_{sync}$, of the synchronized signal.

In step 24, it is evaluated whether phase value, $\theta_{mod}$, is above or below π/4. In step 25, after the phase value, $\theta_{mod}$, is deemed to be above π/4 in step 24, the phase offset value, $\theta_{offset}$, for the following sample is calculated based on the phase offset value, $\theta_{offset}$, for the current sample as being:

$$\theta_{offset}=\theta_{offset}+\theta_{adjust}.$$

In case the phase value, $\theta_{mod}$, is deemed to be below π/4 in step 24, the phase offset value, $\theta_{offset}$, for the following sample is calculated based on the phase offset value, $\theta_{offset}$, for the current sample in step 26 as being:

$$\theta_{offset}=\theta_{offset}-\theta_{adjust}.$$

The phase offset value, ° offset, calculated in step 25 or 26 is then used for phase adjusting or synchronizing the next complex sample received in step 20.

The adjustment value, $\theta_{adjust}$, is a small predetermined value. In one embodiment the adjustment value, $\theta_{adjust}$, is chosen to be below one percent of π/4.

The numeric value of phase offset value, $\theta_{offset}$, will over time reach the point where the probability of a positive adjustment equals the probability of a negative adjustment in step 25 or 26. This equilibrium represents the ideal state, where $\theta_{sync}$ is correctly adjusted. The phase offset value, $\theta_{offset}$, now corresponds to the observed phase offset of the received complex sample, and in the state with the probability of a positive adjustment equals the probability of a negative adjustment, the algorithm shown in FIG. 2 will start to toggle between the two branches including steps 25 and 26. Now the phase offset value, $\theta_{offset}$, will remain substantially stable. The phase compensation unit 11 will compensate for constant phase difference as well time depending offset originating from differences in transmitter and receiver's carrier frequencies.

In one embodiment, the phase compensation unit 11 applies an algorithm using a first order integrator loop for the phase compensation. The integration will completely compensate for a static offset, but a constant phase error will remain if the phase offset is a linear function of time, which is the case when transmitter and receiver frequency are different. To completely compensate for linearly varying phase a second order integrator system is required.

The method discussed above uses phase modulus $\pi/2$ for phase-offset compensation, and the method compensate phase offset to nearest integer multiple of $\pi/2$. This works fine for a coding method e.g. where "1" corresponds to m/2 phase advance, and "0" corresponds to $-\pi/2$.

According to one embodiment of the invention, the method of carrier resynchronization of an MSK signal in a digital receiver and comprising steps of providing samples having a phase value ($\theta_{measure}$) of a down-mixed signal; compensating the phase value ($\theta_{measure}$) of the down-mixed signal by delivering a phase offset compensated sample having a phase value ($\theta_{sync}$); and recovering information content from the phase offset compensated sample. The method further comprises steps of analyzing a phase value ($\theta_{sync}$) of the phase offset compensated sample, calculating a phase offset value ($\theta_{offset}$) based on the phase value ($\theta_{sync}$) of the phase offset compensated sample, and applying the phase offset value ($\theta_{offset}$) when delivering a subsequent phase offset compensated sample.

In one embodiment, the applying of the phase offset value ($\theta_{offset}$) for phase offset compensation of a sample, uses a phase offset value ($\theta_{offset}$) calculated by means of the immediately preceding sample. In another embodiment, on value of the phase offset value ($\theta_{offset}$) is used for compensating a plurality of samples, e.g. 16 or 64.

The method according to the invention has several advantages compared to prior art methods. Firstly, it is not required at any point to calculate the phase for incoming samples. This would be the case if for examples using preambles with synchronization information. Phase calculations are normally expensive and requires several CORDIC iterations. CORDIC mathematical techniques are optimized for low-complexity finite-state CPUs. Secondly, it is not necessary to distinguish between preambles, messages or pauses in the signal to correctly synchronize the incoming signal.

The method works even with very poor signal to noise ratios. Even though when synchronization is lost during transmission due to poor signal quality, synchronization will automatically be regained when signal quality improves. Correct clock recovery is not required. In fact, clock recovery and synchronization may work independently of each other.

The method does not require data assistance. Hence, vicious circles where incorrectly detected data degrades synchronization and vice versa does not exist with this method. The required calculation of ($\theta$ modulus $\pi/2>\pi/4$) is very inexpensive.

According to one embodiment of the invention, the digital receiver in embedded in a radio for use in an inductive radio link between e.g. two binaural hearing aids for increasing the available bandwidth of the receiver.

The invention claimed is:

1. A digital receiver adapted for receiving an MSK modulated signal, the digital receiver comprising:
   a digital front-end unit configured to provide samples having a phase value ($\theta_{measure}$) of a down-mixed signal;
   a phase compensation unit comprising circuitry configured to compensate the phase value ($\theta_{measure}$) by delivering a phase offset compensated sample having a phase value ($\theta_{sync}$); and
   a coherent demodulator configured to recover information content from the phase offset compensated sample;
   wherein the phase compensation unit is configured to:
   analyze a phase value ($\theta_{sync}$) of the phase offset compensated sample using analyzer circuitry,
   calculate a phase offset value ($\theta_{offset}$) based on the phase value ($\theta_{sync}$) of the phase offset compensated sample using calculation circuitry, and
   apply the phase offset value ($\theta_{offset}$) when delivering a subsequent phase offset compensated sample.

2. The digital receiver according to claim 1, wherein the digital front-end component outputs the samples as an in-phase and a quadrature component.

3. The digital receiver according to claim 1, wherein the samples of a down-mixed signal are provided as digital complex values (RE+j IM).

4. The digital receiver according to claim 3, wherein the phase compensation unit (11) is adapted to determine the phase value ($\theta_{sync}$) of the phase offset compensated sample by subtracting an estimate for the phase offset ($\theta_{offset}$) from the phase value ($\theta_{measure}$) of the down-mixed signal.

5. The digital receiver according to claim 4, wherein the phase compensation unit (11) is adapted to determine a modulus-$\pi/2$ value ($\theta_{mod}$) of the phase value ($\theta_{sync}$) of the phase offset compensated sample, and use the modulus-$\pi/2$ value ($\theta_{mod}$) for adjusting the estimate for the phase offset value ($\theta_{offset}$) accordingly.

6. The digital receiver according to claim 5, wherein the phase compensation unit (11) is adapted to compare the modulus-$\pi/2$ value ($\theta_{mod}$) with a threshold and use this comparison for adjusting the estimate for the phase offset value ($\theta_{offset}$).

7. The digital receiver according to claim 6, wherein the phase compensation unit (11) is adapted to adjust the estimate for the phase offset value ($\theta_{offset}$) for a subsequent sample by adding or subtracting a predetermined compensation value ($\theta_{adjust}$) to or from the estimate for the phase offset value ($\theta_{offset}$) for a present sample.

8. A method of carrier resynchronization of an MSK modulated signal in a digital receiver, the method comprising steps of:
   providing samples having a phase value ($\theta_{measure}$) of a down-mixed signal;
   for each sample, compensating the phase value ($\theta_{measure}$) of the down-mixed signal by delivering a phase offset compensated sample having a phase value ($\theta_{sync}$); and
   recovering information content from the phase offset compensated sample;
   wherein the method further comprises steps of:
   analyzing a phase value ($\theta_{sync}$) of the phase offset compensated sample,
   calculating a phase offset value ($\theta_{offset}$) based on the phase value ($\theta_{sync}$) of the phase offset compensated sample, and
   applying the phase offset value ($\theta_{offset}$) when delivering a subsequent phase offset compensated sample.

9. The method according to claim 8 and comprising receiving the down-mixed signal as samples having an in-phase and a quadrature component.

10. The method according to claim 8 and comprising receiving the down-mixed signal as samples at a constant sampling rate.

11. The method according to claim 8 and comprising receiving the down-mixed signal as samples having digital complex values (RE+j IM).

12. The method according to claim 11 and determining the phase value ($\theta_{sync}$) of the phase offset compensated sample by subtracting an estimate for the phase offset ($\theta_{offset}$) from the phase value ($\theta_{measure}$) of the down-mixed signal.

13. The method according to claim 12 and determining a modulus-$\pi/2$ value ($\theta_{mod}$) of the phase value ($\theta_{sync}$) of the phase offset compensated sample, and using the modulus-$\pi/2$ value ($\theta_{mod}$) for adjusting the estimate for the phase offset value ($\theta_{offset}$) accordingly.

14. The method according to claim 13 and comparing the modulus-$\pi/2$ value ($\theta_{mod}$) with a threshold and use this comparison for adjusting the estimate for the phase offset value ($\theta_{offset}$).

15. The method according to claim 14 and adjusting the estimate for the phase offset value ($\theta_{offset}$) for a subsequent sample by adding or subtracting a predetermined compensation value ($\theta_{adjust}$) to or from the estimate for the phase offset value ($\theta_{offset}$) for a present sample.

\* \* \* \* \*